UNITED STATES PATENT OFFICE.

GONZALVO DE CORDOVA, OF BROOKLYN, MORRIS WISE, OF NEW YORK, AND HENRY N. DARRELL, OF BROOKLYN, N. Y.

IMPROVEMENT IN TANNING AND DYEING LEATHER.

Specification forming part of Letters Patent No. 196,339, dated October 23, 1877; application filed July 30, 1877.

*To all whom it may concern:*

Be it known that we, GONZALVO DE CORDOVA, of Brooklyn, county of Kings, and State of New York, MORRIS WISE, of the city, county, and State of New York, and HENRY N. DARRELL, of Brooklyn, county of Kings, and State of New York, have invented a new and Improved Process of Tanning and Dyeing Leather, of which the following is a specification:

The invention relates to an improved process of tanning and dyeing leather; and it consists in employing for tanning and dyeing an extract of the leaves of the pimento or allspice tree, and treating the hides with the same in the customary manner, producing a more rapid tanning, and imparting to the leather a rich brown color or tint.

For the purpose of obtaining the extract, the leaves and sprigs of the pimento or allspice tree are macerated in green or dried state, and boiled, to obtain an astringent extract of the same. The extract is condensed by evaporation to a certain consistency or to a dry powder. It has a dark-brownish color, and is very rich in tannin.

The extract is used in the tanning process in the usual manner, accelerating the same, so that it takes less time to prepare the leather. The coloring matter furnishes a dye of brownish color and durable character, that gives a light coffee tint to the leather, and forms the ground for other colors to be applied. The great percentage of astringent matter in the extract renders the same very effective for tanning purposes, especially as it admits of finishing the tanning process in shorter time than at present.

Having thus fully described our invention, we claim as new and desire to secure by Letters Patent—

In the process of tanning and dyeing leather, the employment of an extract of the leaves and sprigs of the pimento or allspice tree, substantially in the manner described, and for the purpose specified.

G. DE CORDOVA.
MORRIS WISE.
H. N. DARRELL.

Witnesses:
C. SEDGWICK,
PAUL GOEPEL.